United States Patent [19]
Mackay et al.

[11] Patent Number: 6,146,549
[45] Date of Patent: Nov. 14, 2000

[54] CERAMIC MEMBRANES FOR CATALYTIC MEMBRANE REACTORS WITH HIGH IONIC CONDUCTIVITIES AND LOW EXPANSION PROPERTIES

[75] Inventors: Richard Mackay, Lafayette; Anthony F. Sammells, Boulder, both of Colo.

[73] Assignee: Eltron Research, Inc., Boulder, Colo.

[21] Appl. No.: 09/366,823

[22] Filed: Aug. 4, 1999

[51] Int. Cl.$^7$ .............................. C07C 1/02; B01J 20/28; B01J 23/00; B01J 23/40; B01J 23/58

[52] U.S. Cl. .............................. 252/373; 502/4; 502/302; 502/303; 502/306; 502/325; 502/326; 502/328; 502/332; 422/190; 422/222

[58] Field of Search ................................ 502/4, 302, 303, 502/306, 325, 326, 328, 332; 422/190, 222; 252/373

[56] References Cited

U.S. PATENT DOCUMENTS

| | | | |
|---|---|---|---|
| 3,515,163 | 6/1970 | Dzieciuch et al. | 136/6 |
| 3,607,863 | 9/1971 | Dosch | 260/209 |
| 3,754,951 | 8/1973 | Coatney | 106/58 |
| 4,083,730 | 4/1978 | Kwech et al. | 106/89 |
| 4,330,633 | 5/1982 | Yoshisato et al. | 501/152 |
| 4,791,079 | 12/1988 | Hazbun | 504/4 |
| 4,793,904 | 12/1988 | Mazanec et al. | 204/59 |
| 4,802,958 | 2/1989 | Mazanec et al. | 204/80 |
| 4,827,071 | 5/1989 | Hazbun | 585/443 |
| 4,848,984 | 7/1989 | Ezis et al. | 51/309 |
| 4,933,054 | 6/1990 | Mazanec et al. | 204/80 |
| 5,139,077 | 8/1992 | Das et al. | 164/66.1 |
| 5,160,618 | 11/1992 | Burggraaf et al. | 210/500.25 |
| 5,160,713 | 11/1992 | Mazanec et al. | 423/210 |
| 5,210,059 | 5/1993 | Matturo et al. | 502/4 |
| 5,240,480 | 8/1993 | Thorogood et al. | 96/4 |
| 5,306,411 | 4/1994 | Mazanec et al. | 204/266 |
| 5,356,728 | 10/1994 | Balachandran et al. | 429/8 |
| 5,366,712 | 11/1994 | Violante et al. | 423/248 |
| 5,393,325 | 2/1995 | Edlund | 95/56 |
| 5,397,541 | 3/1995 | Post | 422/88 |
| 5,430,209 | 7/1995 | Agaskar et al. | 585/315 |
| 5,466,646 | 11/1995 | Moser | 502/60 |
| 5,534,471 | 7/1996 | Carolan et al. | 502/4 |
| 5,569,633 | 10/1996 | Carolan | 502/4 |
| 5,580,497 | 12/1996 | Balachandran et al. | 252/519 |
| 5,591,315 | 1/1997 | Mazanec et al. | 205/462 |
| 5,639,437 | 6/1997 | Balachandran et al. | 423/593 |
| 5,648,304 | 7/1997 | Mazanec et al. | 501/134 |
| 5,693,212 | 12/1997 | Mazanec et al. | 205/462 |
| 5,702,999 | 12/1997 | Mazanec et al. | 501/152 |
| 5,712,220 | 1/1998 | Carolan et al. | 502/400 |
| 5,714,091 | 2/1998 | Mazanec et al. | 252/373 |
| 5,723,035 | 3/1998 | Mazanec et al. | 204/295 |
| 5,723,074 | 3/1998 | Balachandran et al. | 252/519 |
| 5,744,015 | 4/1998 | Mazanec et al. | 204/295 |
| 5,779,904 | 7/1998 | Ruderman et al. | 210/500.25 |
| 5,788,748 | 8/1998 | Mazanec et al. | 96/4 |
| 5,817,597 | 10/1998 | Carolan | 502/400 |
| 5,821,185 | 10/1998 | White et al. | 502/4 |
| 5,888,272 | 3/1999 | Prasad et al. | 95/54 |
| 5,911,860 | 6/1999 | Chen et al. | 204/295 |

FOREIGN PATENT DOCUMENTS

| | | |
|---|---|---|
| 399 833 | 11/1990 | European Pat. Off. . |
| 673 675 | 9/1995 | European Pat. Off. . |
| 705 790 | 4/1996 | European Pat. Off. . |
| 766 330 | 4/1997 | European Pat. Off. . |
| 438 902 | 5/1997 | European Pat. Off. . |
| 2203446 | 3/1988 | United Kingdom . |
| 94/24065 | 10/1994 | WIPO . |
| 97/41060 | 11/1997 | WIPO . |
| 99/21649 | 5/1999 | WIPO . |

OTHER PUBLICATIONS

Teraoka et al. (1988) Mat. Res. Bull. 23:51–58.
Teraoka et al. (1985) Chem. Lett. 1743–1746.
Teraoka et al. (1988) Chem. Lett. 503–506.
Matsumoto et al. (1980) J. Electrochem. Soc. 127(11):2360–2364.
Goodenough et al. (1990) Solid State Ionics 44:21–31.
Zhen, Y.S. and Goodenough, J.B. (1990) Mat. Res. Bull. 25:785–790.
Gallagher et al. (1964) J. Chem. Phys. 41(8):2429–2434.
Greaves et al. (1975) Acta Cryst. B31:641–646.
Sammells et al. (1992) Solid State Ionics 52:111–123.
Cook. R.L. and Sammells, A.F. (1991) Solid State Ionics 45:311–321.
Cook et al. (1990) J. Electrochem. Soc. 137:3309–3310.
Teraoka et al. (1985) Chem. Lett. 1367–1370.
Crespin, M. and Hall, K.W. (1981) J. Catal. 69:359–370.
Chick et al. (1990)Mater. Lett. 10(1,2):6–12.
Pederson et al. (1991) Mater. Lett.10(9,10):437–443.
van der Pauw (1958) Philips Res. Rep. 13(1):1–9.
Rostrup–Nielson, J.R. and Bak Hansen, J.–H. (1993) J. Catalysis 144:38–49.
Sammells, T., (1991), "Rational Selection of Perovskites for Solid Electrolytes and Electrocatalysis," Presented at BP America Research, Warrenville Research Center, Sep. 16, 1991, 46pp.

(List continued on next page.)

Primary Examiner—Johann Richter
Assistant Examiner—J. Parsa
Attorney, Agent, or Firm—Greenlee, Winner & Sullivan, P.C.

[57] ABSTRACT

Ceramics of the composition:

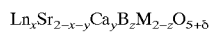

$$Ln_xSr_{2-x-y}Ca_yB_zM_{2-z}O_{5+\delta}$$

where Ln is an element selected from the fblock lanthanide elements and yttrium or mixtures thereof; B is an element selected from Al, Ga, In or mixtures thereof; M is a d-block transition element of mixtures thereof; $0.01 \leq x \leq 1.0$; $0.01 \leq y \leq 0.7$; $0.01 \leq z \leq 1.0$ and $\delta$ is a number that varies to maintain charge neutrality are provided. These ceramics are useful in ceramic membranes and exhibit high ionic conductivity, high chemical stability under catalytic membrane reactor conditions and low coefficients of expansion. The materials of the invention are particularly useful in producing synthesis gas.

20 Claims, 3 Drawing Sheets

OTHER PUBLICATIONS

Pujare, N U and Sammells, A.F. (1988) J. Electrochem. Soc. 135(10):2544–2545.

Shin, S. and Yonemura, M. (1978) Mat. Res. Bull. 13:1017–1021.

Teraoka, Y. et al. (1989) J. Ceram. Soc. Jpn. Inter. Ed. 97:458–462.

Teraoka, Y. et al. (1989) J. Ceram. Soc. Jpn. Inter. Ed. 97:523–529.

Kuchynka, D.J. et al. (1991) J. Electrochem. Soc. 138(5):1284–1299.

Sammells, A.F. and Cook, R.L. (1991), "Rational Selection of Advanced Solid Electrolytes for Intermediate Temperature Fuel Cells," presented at the Ceramic Conductors for Solid–State Electrochemical Devices Meeting, May 12–15, 1991, Snowbird, UT, (abstract only).

Schwartz, M. et al. (1993) J. Electrochem. Soc. 140(4):L62–L63 (Apr.).

CERAMIC MEMBRANES FOR CATALYTIC MEMBRANE REACTORS WITH HIGH IONIC CONDUCTIVITIES AND LOW EXPANSION PROPERTIES

STATEMENT REGARDING FEDERALLY SPONSORED RESEARCH OR DEVELOPMENT

This invention was made with Government support under Grant No. DE-FG02-94ER81750 awarded by the Department of Energy. The Government has certain rights in the invention.

BACKGROUND OF THE INVENTION

A class of brownmillerite-derived materials have been found to be mixed ionic and electronic conductors (MIEC). See: PCT/US96/14841, filed Sep. 13, 1996 and U.S. patent application Ser. No. 09/314,708, filed May 19, 1999. Gas-impermeable membranes made from MIECs behave as short-circuited electrochemical cells, in which oxygen anions and electrons conduct in opposite directions through the membrane. The oxygen anion conductivity of these materials make them useful for the efficient generation of pure oxygen which can be employed in catalytic oxidation reactions. The electronic conductivity of these materials provides for spontaneous gas phase separation and any subsequent oxidation without the addition of external electronic circuitry. MIEC membranes have found application in catalytic membrane reactors (CMRs) for a variety of processes where oxygen reacts with inorganic or organic species, such as hydrocarbons, including but not limited to the partial oxidation of methane and other hydrocarbons to synthesis gas, the oxidative coupling of aliphatic and aromatic hydrocarbons, and the gasification of coal. CMR processes can also include decomposition of organic environmental pollutants such as PCBs. These membranes can simply be used for the separation of oxygen from oxygen-containing gas (e.g., air) and the production of pure oxygen.

MIEC brownmillerite-derived ceramics are of general composition:

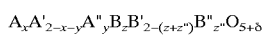

$$A_x A'_{2-x-y} A''_y B_z B'_{2-(z+z'')} B''_{z''} O_{5+\delta}$$

where A is an element from the fblock lanthanide elements; A' is an element selected from the Group 2 elements, A" is an element from the fblock lanthanide or Group 2 elements; B is an element selected from Al, Ga, In or mixtures thereof; B' and B" are different elements and are selected independently from the group of elements Mg, and the d-block transition elements, including Zn, Cd, or Hg; $0<x<2$, $0 \leq y<2$, $0<z<2$, and $0 \leq z''<2$, where $x+y \leq 2$, $z+z'' \leq 2$ and $\delta$ varies to maintain electroneutrality. A" and B" may or may not be present.

The lanthanide metals include the fblock lanthanide metals: La, Ce, Pr, Nd, Pm, Sm, Eu, Gd, Tb, Dy, Ho, Er, Tm, Yb, and Lu. Yttrium has properties similar to the fblock lanthanide metals and is also included herein in the definition of lanthanide metals. Ln is preferably La or mixtures of La with other lanthanides. The more preferred B elements are Ga and Al. The d block transition elements include Sc, Ti, V, Cr, Mn, Fe, Co, Ni, Cu, and Zn. Preferred M are Fe, Fe mixed with Co, with Fe being more preferred as M.

Ceramic materials typically have low coefficients of expansion, and are inherently brittle. Metals in general have higher coefficients of expansion and are more ductile. The difficulties in implementing ceramic materials in existing hardware designs often result from the differing properties of the materials. The expansion of many mixed conductors is quite high. This arises from the combination of both thermal expansion and chemical expansion. The thermal expansion common to most materials arises from the increased amplitude of atomic vibrations. The increased amplitude of vibration leads to increased atomic separation, corresponding to a lattice expansion. Certain materials also have a significant, nonzero, chemical expansion. This arises from a change in composition as a function of temperature, without a change in crystal structure. In the case of these metal oxides, the chemical expansion is a result of the change in oxygen concentration as a function of temperature. Metal oxides heated in air are slightly reduced. The high ionic conductivity of these materials suggests high ion mobility and high vacancy concentration. The membrane material has the ability to accommodate a high number of vacancies. The vacancy concentration changes as a function of temperature and oxygen partial pressure. Large expansion can cause excessive stresses in reactor design.

In operation, the ceramic membranes of CMRs are exposed to extreme operating conditions. The opposite surfaces of the membranes are simultaneously exposed to a highly oxidizing atmosphere and a highly reducing atmosphere, respectively, at high temperatures. Also, the chemical and thermal expansion of the ceramic membranes in CMRs can lead to excessive stresses on the reactor. Thus, there is a need in the art for ceramic membrane materials that retain excellent ionic and electronic conductivities and which exhibit chemical stability with respect to decomposition and, in addition, exhibit low expansion properties.

SUMMARY OF THE INVENTION

This invention relates to ceramic compositions for use in ceramic membranes. The ceramic compositions exhibit high ionic conductivity, high chemical stability under CMR operating conditions and low coefficients of expansion. The materials of this invention are particularly useful in processes for making synthesis gas.

MIEC brownmillerite-derived ceramics of this invention include those of composition:

$$Ln_x Sr_{2-x-y} Ca_y B_z M_{2-z} O_{5+\delta}$$

where Ln is an fblock lanthanide metal or yttrium or mixtures thereof; B is Ga, Al or In or mixtures thereof; M is a d block transition metal or mixtures thereof; $0.01 \leq x \leq 1.0$; $0.01 \leq y \leq 0.7$; $0.01 \leq z \leq 1.0$ and $\delta$ varies to maintain charge neutrality.

The value of $\delta$ in the above formula depends upon the values of x, y and z and the oxidation states of the metal elements. The value $\delta$ is such that the mixed metal oxide material is charge neutral. In preferred materials, $0 < \delta < 1$.

In preferred MIEC materials of this formula $0.30 \leq x \leq 0.60$, $0.05 \leq y \leq 0.3$ and $0.60 \leq z \leq 1.0$.

The ceramic materials may be prepared as a single-phase material or may contain small amounts of second phases, such as $SrAl_2O_4$-type compounds, (mixed-phase material). The presence of second phases are not detrimental to the properties of the mixed conducting materials, and may even enhance the mechanical properties of the materials. Second phases present in amounts equal to or less than about 20% by weight may act as sintering aids and/or provide mechanical strength to ceramic parts.

Ceramic membranes of this invention can have any shape, form or dimensions suitable for use in various CMRs. In particular, membranes can be tubes of various diameters and lengths and flat plates or disks of various diameters. Ceramic membranes can be substantially composed of single or mixed phase ceramic as a dense material with membrane thicknesses ranging from about 0.5 to about 2 mm. Alternatively, gas impermeable membranes can be composed of a porous substrate supporting a dense thin film of the single or mixed phase ceramic, typically having a film thickness of about 1 $\mu$m to about 300 $\mu$m, more preferably having a thickness of 10 $\mu$m to about 100 $\mu$m.

Second phases employed in the ceramic materials of this invention may improve the mechanical strength of the MEIC materials and are not significantly detrimental to their electrical properties. Second phases are structurally distinct from the MIEC phases. Second phases can include phases of the $AB_2O_4$ structure type, such as $SrAl_2O_4$, and the $A_2BO_4$ structure type, such as $Sr_2AlO_4$. More generally, second phases can include the quaternary and ternary oxide phases of the elements of the formula above (Ln, Sr, Ca, B and/or M). The amount of second phase(s) which can be present in the final ceramic products (membranes) and improve their mechanical properties can vary most generally between about 0.1 wt % and about 20 wt %.

Ceramic membranes prepared from ionic- and electronic-conducting metal oxides of the above formula have relatively low expansion coefficients as a function of temperature. Preferred membranes have expansion coefficients of about $15 \times 10^{-6}$/°C. or less. Preferred membranes exhibit total synthesis gas production rates of about 10 ml/min·cm$^2$ or more for a membrane of a given thickness.

Ceramic membranes prepared using ionic- and electronic-conducting metal oxides of the above formula exhibit good stability under CMR conditions, particularly under the reactor conditions for synthesis gas production. These membranes can be employed in reactors described herein under synthesis gas reactor conditions for several thousand hours or more without failure.

The invention also provides methods for making gas-impermeable membranes for use in CMRs, particularly for use in CMRs for synthesis gas production. In these methods a metal oxide exhibiting mixed ion and electron conduction is produced and used to form dense membranes by isostatic pressing or to form membranes having dense thin films on porous substrates.

DETAILED DESCRIPTION OF THE INVENTION

Figure 1:
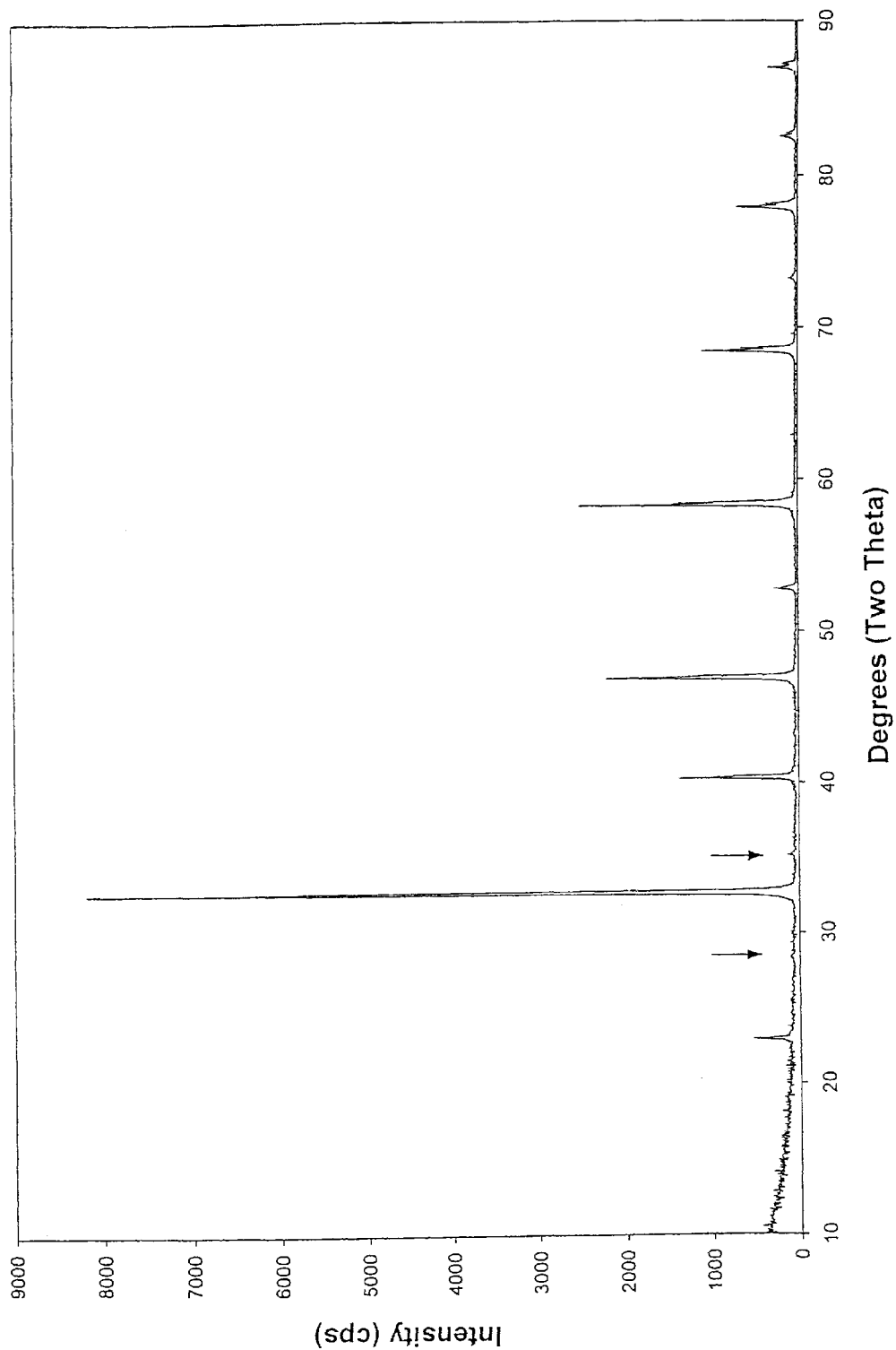
FIG. 1 is an X-ray diffraction scan of the MIEC material of Example 3 which is shown to be $La_{0.3}Sr_{1.4}Ca_{0.3}Al_{0.6}Fe_{1.4}O_{5+\delta}$.
Figure 2:
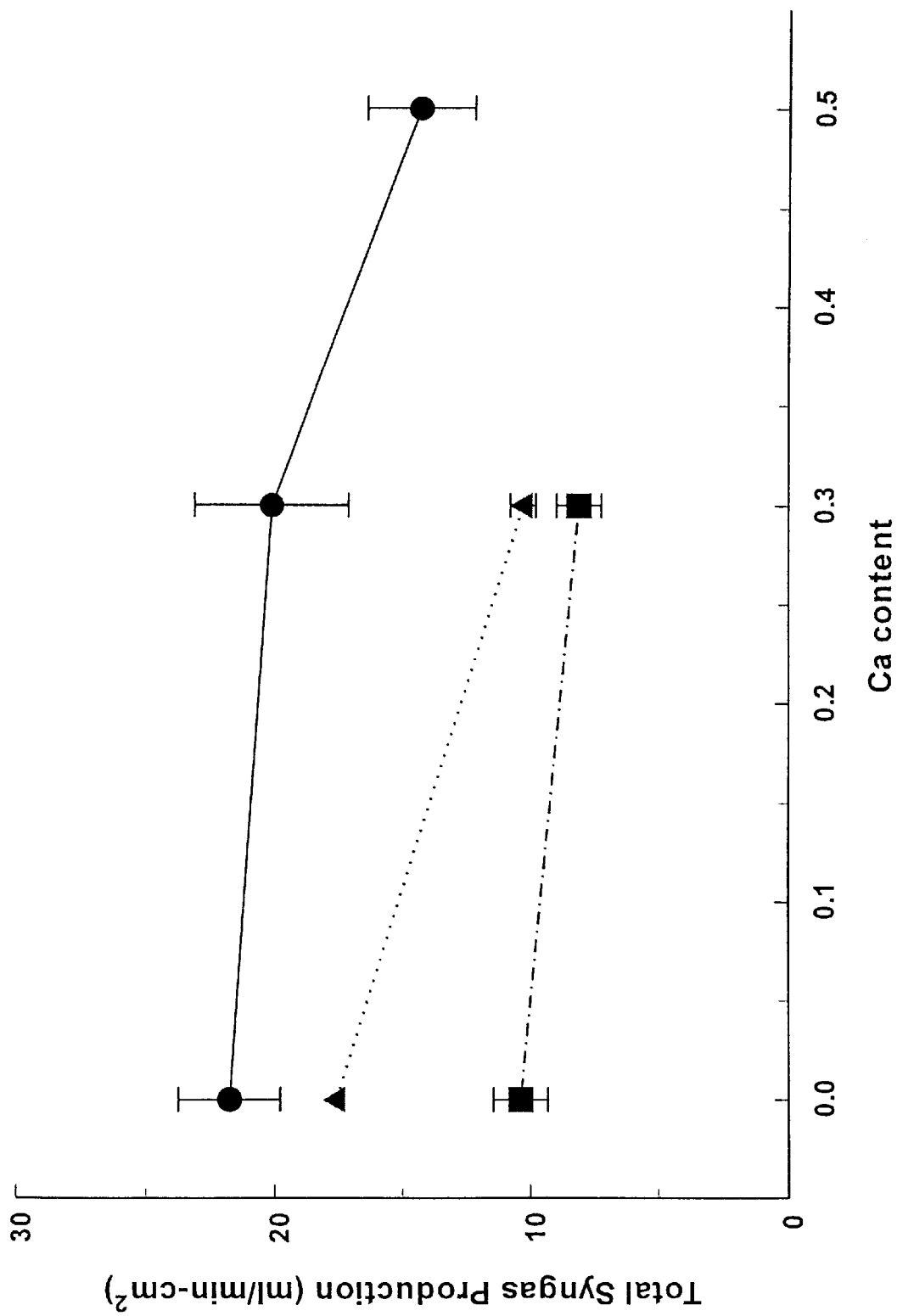
FIG. 2 is a graph showing the change in total syngas production rates as a function of Ca content in $Sr_{1.7-x}Ca_xLa_{0.3}Al_{0.6}Fe_{1.4}O_{5+\delta}$ (●), $Sr_{1.7-x}Ca_xLa_{0.3}Al_{0.8}Fe_{1.2}O_{5+\delta}$ (▲), and $Sr_{1.4-x}Ca_xLa_{0.6}Al_{1.0}Fe_{1.0}O_{5+\delta}$ (■).

Mixed ionic and electronic conducting (MIEC) membranes behave as short-circuited electrochemical cells, with appropriate catalysts applied for promoting each half reaction on their respective oxidizing and reducing surfaces. Ionic transport of $O^{2-}$ proceeds from reducing to oxidizing membrane surfaces with electrons mediating from oxidizing to reducing surfaces via the ceramic membrane.

A catalytic membrane reactor (CMR) has an oxidation zone and a reduction zone separated by a gas-impermeable membrane. The membrane surface in contact with the reduction zone is the reduction surface which optionally has a reduction catalyst layer. The membrane surface in contact with the oxidation zone is the oxidation surface which optionally has an oxidation catalyst layer. The reactor is provided with passageways for entrance and exit of gases from the reduction and oxidation zones. Multiple CMRs can be linked in series or in parallel (with respect to gas flows) for improved efficiency or speed of reaction.

A variety of CMRs are known in the art and can be employed in combination with the improved membranes of this invention. The improved mechanical properties of the membrane materials herein are particularly useful in systems employing tubular membranes and any other membrane structures or configurations that are subject to increased stresses during operation. U.S. Pat. Nos. 5,817,597; 5,712,220; 5,723,074; 5,580,497 and 5,888,272 provide examples of CMRs and CMR processes in which the catalytic membranes of this invention can be used.

PCT application WO98/23051, filed Oct. 29, 1998, which is incorporated in its entirety herein by reference to the extent not inconsistent herewith, describes catalytic membrane reactors having a three dimensional catalyst within the reactor, e.g., having a packed-bed catalyst. Catalytic membranes of this invention can be employed in the reactor systems described therein.

In a CMR, an oxygen-containing gas or gas mixture, such as air, is passed in contact with the membrane in the reduction zone, and the reactant gas or gas mixture, i.e., the oxygen-consuming gas, such as a reactant gas containing methane, is passed in contact with the membrane in the oxidation zone. As the oxygen-containing gas or gas mixture contacts the membrane, oxygen is reduced to oxygen anions which are transported through the membrane (as ions) to the membrane oxidation surface, facing the oxidation zone. In the oxidation zone, the oxygen anions react with the oxygen-consuming gas or gas mixture, oxidizing the oxygen-consuming gas and releasing electrons. The electrons return to the membrane reduction surface facing the reduction zone via transport through the membrane.

Membranes of CMRs are employed to form a gas-impermeable, yet ion and electron conducting barrier, between the oxidation and reduction zones of the reactor. Membranes are typically mounted between the reactor zones employing a gas-impermeable sealant. A variety of methods and sealing materials are known in the art. U.S. provisional application 60/129,683, filed Apr. 16, 1999, provides improved sealant materials for use in CMRs having mixed metal oxide membranes. This provisional application is incorporated in its entirety by reference herein to the extent not inconsistent herewith.

The term "oxygen-containing gas" is used broadly herein to include gases and mixtures of gases in which at least one of the component gases is oxygen or an oxide. The oxygen or oxide component of the gas is capable of being reduced at the reduction surface of the membrane of this invention. The term includes carbon, nitrogen, and sulfur oxides ($CO_x$, $NO_x$ and $SO_x$) among others, and gas mixtures in which an oxide is a component, e.g. $NO_x$, in an inert gas or in another gas not reactive with the membrane. The term also includes mixtures of oxygen in other gases, e.g. $O_2$ in air. In the reactors of this invention, the oxygen-containing gas is passed in contact with the reduction surface of the membrane and the oxygen-containing component of the gas is at least partially reduced at the reduction surface, e.g., $NO_x$ to $N_2$. The gas passing out of the reduction zone of the reactor may contain residual oxygen or oxygen-containing component.

The term "reactant gas" is used broadly herein to refer to gases or mixtures of gases containing at least one component that is capable of being oxidized at the oxidation surface of a reactor of this invention. Reactant gas components include, but are not limited to methane, natural gas (whose major component is methane), gaseous hydrocarbons including light hydrocarbons (as this term is defined in the chemical arts), partially oxidized hydrocarbons such as methanol alcohols (ethanol, etc.) and organic environmental pollutants. Reactant gases include mixtures of reactant gas components, mixtures of such components with inert gases, or mixtures of such components with oxygen-containing species, such as CO, $CO_2$ or $H_2O$. The term "oxygen-consuming gas" may also be used herein to describe a reactant gas that reacts with oxygen anions generated at the oxidizing surface of the membrane. Reactant gas also includes gases with suspended or entrained particles, such as carbon particles slurried in water vapor.

The term "oxygen-depleted gas" refers to a gas or gas mixture from which oxygen has been separated by passage through a reactor of this invention (i.e., the residual of the oxygen-containing gas). The term "sweep gas" refers to a gas or gas mixture that is introduced into the oxidation zone of a reactor used for oxygen separation to carry the separated oxygen. The sweep gas may be an inert gas, air or other non-reactive gas that substantially does not contain components that will be oxidized in the oxidation zone of the reactor. The sweep gas can be applied to mixtures containing some oxygen, such as air, the oxygen content of which will be increased by passage through the oxidation zone of the reactor.

The term "partial vacuum" applies to the application of a partial vacuum, i.e., less than ambient pressure, to the oxidation zone of a reactor and may refer to high or low vacuum depending upon the construction of the reactor. Application of a partial vacuum to the oxidation zone of a reactor used for oxygen separation can be employed to collect gases for ultimate concentration of the separated oxygen. Gases in the oxidation or reduction zones of the CMR can be at ambient pressure or at pressures higher or lower than ambient.

The terms "reactant gas," "oxygen-depleted gas," "oxygen-consuming gas," and "oxygen-containing gas" and any other gas mixture discussed herein include materials which are not gases at temperatures below the temperature ranges of the pertinent process of the present invention or at pressures of the CMR, and may include materials which are liquid or solid at room temperature. An example of an oxygen-containing gas which is liquid at room temperature is steam.

The term "gas-impermeable" as applied to membrane of this invention means that the membrane is substantially impervious to the passage of oxygen-containing or reactant gases in the reactor. Minor amounts of transport of gases across the membrane may occur without detriment to the efficiency of the reactor. It may be that membranes of this invention will allow passage of low molecular weight gases such as $H_2$. The membranes of this invention conduct oxygen anions and in this sense are permeable to oxygen.

The membrane materials of this invention may be single phase or may contain relatively small amounts of second phases (mixed phase ceramics). In a crystalline single-phase material, the elements combine in a well-ordered array. The presence of a single-phase can be assessed by XRD or similar known techniques of phase identification (scanning electron microscopy (SEM) or transmission electron microscopy (TEM)).

A mixed phase material contains one or more distinct crystalline phases. In the mixed phase materials of this invention, the predominate phase is a material that exhibits both ionic and electronic conductivity (MIEC). The second phase or phases present enhance the mechanical strength of the mixed phase material. Exemplary second phases are mixed metal oxides distinguishable in structure from the predominant MIEC phase. The presence and amounts of second phases in the mixed phase materials of this invention can be assessed by X-ray diffraction or by SEM or TEM techniques.

These methods and X-ray diffraction analysis can also be employed as known in the art to quantify the amount of second phase(s) present. Crystalline second phases can be detected by X-ray diffraction if they are present at levels of about 4 wt % or more. The amount of second phase detectable by X-ray diffraction depends upon the specific second phase or phases present. SEM and particularly TEM methods can typically be employed to quantify lower amounts of second phases.

In preferred ceramic compositions, the MIEC phase of the ceramic materials of this invention represents about 80 wt % or more of the composition. In more preferred compositions, the MIEC phase represents about 90 wt % or more of the composition. Lower levels (up to about 5 wt %) of second phases can arise as impurities during the preparation of MIEC materials, because of impurities in starting material resulting in inaccuracies in measurement of metal stoichiometries prior to reaction. Second phases can be selectively added to MIEC up to about 20 wt % by mixing components in off-stoichiometric amounts, i.e., by adding additional amounts of one or more metal precursors.

Second phases can be added to the MIEC materials by any method. One method is to add the desired second phase or phases to a substantially single-phase MIEC material in powder form, and mix thoroughly to distribute the second phase homogeneously in the mixture prior to pressing and sintering membranes. Another method is to form the second phase or phases simultaneously with the formation of the desired membrane material by mixing an off-stoichiometric ratio of the starting materials.

Mixed phase materials of this invention can be prepared by combining starting materials in off-stoichiometric ratios. The term "stoichiometric" refers to the relative amounts of starting metal compounds (e.g., metal oxides or carbonates) combined to obtain a mixed metal oxide of a given formula. Stoichiometric mixing provides the component metals in the correct relative molar amounts according to the mixed metal oxide formula.

The term "off-stoichiometric" refers to the relative amounts of starting materials combined to be somewhat off (i.e., higher or lower) of those required for the formula of the desired MIEC phase. In an off-stoichiometric composition, one or more of the starting components are present in a higher or lower amount than required to obtain the desired stoichiometry of the MIEC phase.

Examples of processes which may be conducted in CMRs using MIEC membranes include the combustion of hydrogen to produce water, the partial oxidation of methane, natural gas or other light hydrocarbons to produce unsaturated compounds or synthesis gas, the partial oxidation of ethane, extraction of oxygen from oxygen-containing gases, e.g., extraction of oxygen from: $NO_x$, wherein x has a value from 0.5 to 2; $SO_y$, wherein y has a value from 2 to 3, steam, or $CO_2$; ammoxidation of methane to hydrogen cyanide, and oxidation of $H_2S$ to produce $H_2O$ and S.

The partial oxidation of methane and other hydrocarbons to produce synthesis gas is a spontaneous process to produce either a high value fuel or a feedstream for high value chemicals. This process can be carried out in the presence of $CO_2$ and steam. When these ceramic materials are used for the partial oxidation of methane to produce syngas, the reaction can be written:

$$CH_4 + \tfrac{1}{2}O_2 \rightarrow CO + 2H_2$$

The product mixture can be converted to value added chemicals through the Fisher-Tropsch reaction. This would make the recovery of methane from gas and oil reserves a favorable operation. The reaction is exothermic, and the energy release can be modified by addition of $CO_2$, carbon dioxide or $H_2O$, steam, which react endothermically with $CH_4$, and which can modify the $H_2$:CO ratio in the product stream. At the heart of the process is the ceramic membrane reactor which separates pure oxygen from the air. Mixed conductors are ideally suited for this.

Coal gasification also produces syngas, but by the combination of steam reforming and partial oxidation of carbon. In this case, the reactant gas can be a slurry of carbon particles in steam. The overall reaction for this process can be written:

$$2C + \tfrac{1}{2}O_2 + H_2O \rightarrow 2CO + H_2$$

A further reaction that can be conducted with CMR is the oxydehydration reaction of ethane, according to the reaction:

$$C_2H_6 + \tfrac{1}{2}O_2 \rightarrow C_2H_4 + H_2O$$

Coupling reactions can also be facilitated by these membranes. One example is the coupling of methane to form ethane or ethylene, or of methane and ethane to form propane, and higher alkanes and alkenes. The coupling of toluene ($C_6H_5CH_3$) to form stilbene ($C_6H_5CH=CHC_6H_5$), as an intermediate in the formation of benzoic acid, can also be carried out using these membranes.

Partial oxidation and coupling reactions of CRMs can employ unsaturated and saturated linear, branched, and cyclic hydrocarbons, partially oxidized hydrocarbons, as well as aromatic hydrocarbons as reactants. Specific examples include methane, ethane, ethylene, propane, etc., cyclopropane, cyclobutane, cyclopentane, cyclopentene, etc., isobutane, isobutene, methylpentane, etc., and benzene, ethylbenzene, napthalene, methanol, ethanol, etc. Products of reactions with these various hydrocarbon species will generally depend upon the types of oxidation and or reduction catalysts on the membrane surfaces.

All of the listed examples make use of pure oxygen as a reactant. CMRs may also be used for the separation and production of high purity oxygen. Because these reactions make use of pure oxygen separated from the air by the mixed conducting membrane, there is no nitrogen present, and hence no $NO_x$ compounds are generated. The formation of the products acts a driving force for the permeation of oxygen through the ceramic membrane, as the reaction of oxygen maintains a very low partial pressure of oxygen on the product side. Particularly in the case of coupling reactions, selection of catalysts for the oxidation and/or the reduction surface of the membranes is important to improve production with optimal selectivity.

Another type of process suitable for CMRs, is the reaction of an oxygen-containing gas which is capable of losing oxygen, for example, NO, $NO_2$, $SO_2$, $SO_3$, CO, $CO_2$, etc. The oxidation zone of the reactor is exposed to a partial vacuum, an inert gas, or a gas that will react with oxygen (e.g., various hydrocarbons). Effective ranges of partial vacuum range from approximately 100 Torr to $10^{-6}$ Torr. An example is where the reactant gas is methane, natural gas, or hydrogen and the oxygen-containing gas is a flue or exhaust gas containing $NO_x$, and or $SO_y$, wherein x is 0.5 to 2 and y is 2 to 3. As the flue gas contacts the membrane, any oxygen present or the oxygen in $NO_x$ and/or $SO_y$ is reduced to oxygen anions which are transported through the membrane to the oxidation zone where the oxygen anions react with the oxygen-consuming gas to produce carbon dioxide and water, synthesis gas or olefins, depending on the reaction conditions. Nitrogen gas and elemental sulfur are produced from $NO_x$ and $SO_y$ respectively, in the reduction zone.

In another type of CMR reaction, the oxygen-containing gas is a gas-containing steam (i.e., $H_2O$ gas). As $H_2O$ contacts the membrane, the oxygen of $H_2O$ is reduced to oxygen anions which are transported through the membrane to the oxidation zone where the oxygen anions react with methane or natural gas, for example. The $H_2O$ is reduced to hydrogen gas ($H_2$) in the reduction zone. The hydrogen gas may be recovered and used, for example, to hydrogenate unsaturated hydrocarbons, provide fuel for an electrical current generating fuel cell, to provide fuel for heating the catalytic membrane reactor of this invention or to provide reactant gas for the process for extracting oxygen from an oxygen-containing gas in accordance with the present invention.

Materials which are co-present in any reactor feed gases may participate in catalytic membrane reduction or oxidation taking place at the membrane of the present invention. When, for example, methane is present with ammonia in the oxidation zone and an oxygen-containing gas is present in the reduction zone, hydrogen cyanide and water can be produced in the oxidation zone. Reactors of the present invention can also be applied to the oxidative reforming of $CO_2/CH_4$ mixtures to synthesis gas. Other combinations of materials reactive with each other in CMRs to produce a wide range of products are possible and are contemplated as being within the scope of the invention.

Optional Catalysts

It has been found that certain catalysts may be used to significantly enhance the efficiency of the reaction being mediated by the membrane. Catalysts to be used are specific to each reaction. For example, in the partial oxidation of methane, natural gas, or light hydrocarbons to synthesis gas, the catalyst must be able to dissociatively adsorb the hydrocarbon species, followed by oxygen atom transfer to the dissociatively adsorbed residue. The first requirement is met with catalysts possessing considerable hydrogen affinity (e.g. surface hydride forming ability or surface basicity). Oxygen atom transfer to the residue implies that the catalyst possesses only modest metal-oxygen binding energy and is reversibly reducible. Catalysts possessing these features include the platinum group metals Ni, Pd, Pt, Rh, Ru, Ir, and Os, as well as the first row transition metals Fe, Mn, and Co. Incorporation of these metals or their combinations onto the oxidation surface of oxygen anion conducting membranes provides a strategy for direct partial oxidation of hydrocarbons. Moderation of catalyst activity to avoid coke formation is achieved by the incorporation of metal clusters into ceramics such as $CeO_2$, $Bi_2O_3$, $ZrO_2$, $CaB_{1-x}B'_xO_{3-\delta}$, $SrB_{1-x}B'_xO_{3-\delta}$ or $BaB_{1-x}B'_xO_{3-\delta}$ (where B=4+-lanthanide ion such as Ce, Th, or Pr; B'=3+-lanthanide ion such as Gd or Nd; 0<x<0.2) and $\delta$ is a number that varies to maintain charge neutrality. Additionally, incorporation of transition metal ions into the B-site of a perovskite, with a basic A-site, will give an active catalyst since the bonding of the metal ion to oxygen will be correspondingly weakened and the oxygen atom transfer activity of the metal ion enhanced. Perovskites possessing the general formula $A_{1-x}A_x'B_{1-y}B_y'O_{3-\delta}$ (where A=lanthanide metal ion or Y; A'=alkali or alkaline earth cation and $0<x<0.8$; B=transition metal ion such as Fe, Ni, or Co; B'=Ce or Cu, Ag, Au or Pt, Pd, or Ni, $0<y<0.3$) and $\delta$ is a number that varies to maintain charge neutrality.

For the reductive decomposition of $NO_x$ and $SO_x$, as well as for oxygen concentration, perovskites are again favored catalysts. In $NO_x$ decomposition, the catalyst must preferentially adsorb $NO_x$ over $O_2$ and permit the facile release of adsorbed O atoms. The first requirement is met by the use of the first row transition metal ions including Fe, Co, Ni, and Cu, as well as by group VIII metals such as Ru, Pt, or Pd in the B-site. The second requirement is met by the employment of basic or low melting metals in the A-site (Pb, Bi, or Sb, lanthanides or Group IA and IIA dopants) as well as by the use of Ru or Group IB metals (Ag or Au) as a B-site dopant. These conditions are expected to produce generally weak M—O bonds, permitting the required surface and bulk mobility of oxygen ions. In addition, catalysts such as transition metals (Cu, Ag, Au, Pd, Pt, Rh, Ir, Os) supported on metal oxides, (e.g. $Fe_2O_3$, $Co_2O_3$, $Fe_3O_4$, NiO, $Ni_2O_3$, MnO, $MnO_2$) and prepared by various methods such as coprecipitation, impregnation, etc., are expected to be active.

$SO_x$ decomposition may be promoted in a similar manner to $NO_x$ decomposition, but the issue of sulfur tolerance arises. In that case, materials based on the Group VIB metals (Cr, Mo, and W) such as $WS_2$ or WC or on the Group VIII metals (Fe, Co, Ni, and Cu) such as the thioperovskites $ABS_3$ (where A is a lanthanide and B is a Group VIII metal), thiospinels $AB_2S_4$ (where A is a $2^+$ Group VIII ion and B is a $3^+$ Group VIII ion) or Chevrel phases $A_2MO_6S_8$ (where A is Fe, Co, Ni, Cu, Zn) are applicable. Similar requirements for oxygen reduction as for $NO_x$ reduction point to the use of similar perovskite catalysts.

$H_2S$ decomposition is similar to that of $SO_x$ decomposition. The preferred catalysts for this process are thiospinels $AB_2S_4$ (where A is a $2^+$ Group VIII ion and B is a $3^+$ Group VIII ion) or $WS_2$.

Previous work examining oxygen desorption using Temperature Programmed Desorption (TPD) from perovskite oxides has shown that two types of oxygen can become desorbed (Y. Teraoka, H.-M. Zhang and N. Yamazoe, Chem.Lett. 1367 (1955)). Here oxygen desorbed at lower temperatures, termed a oxygen, corresponds to adsorbed surface oxygen, and that desorbed at higher temperatures, designated $\beta$ oxygen, is desorbed from lattice sites within the perovskite. TPD studies on oxygen desorption from perovskite oxides have been studied as a function of the nature and concentration of dopant atoms introduced into both the A- and B-sites. A brief discussion of some of these results and their relevance to selection of perovskite sites for oxygen evolution at intermediate temperatures is presented below.

TPD studies of oxygen evolution from perovskite oxides has shown the amount of $\alpha$-oxygen desorbed from $Ln_{1-x}A_xMO_3$ (Ln is a lanthanide, A is an alkaline earth metal, and M is Co, Fe Ni Cr) was a function of x and hence the vacancy concentration and was little affected by the nature of the B-site. These results suggested that $\alpha$-oxygen occupied normally empty oxygen vacancy sites. The onset temperature where $\alpha$-oxygen evolved was found to increase upon going from Ba to Sr to Ca in the A lattice site. Calculation of the average metal oxygen bond energy for the series $La_{1-x}A_xCoO_3$ (A is Ba, Sr and Ca) using the equation:

$$ABE = \frac{1}{12m}\left(\Delta H_{A_mO_n} - m\Delta H_A - \frac{1}{n}D_{(O_2)}\right) + \frac{1}{6m}(\Delta H_{B_mO_n} - m\Delta H_B)$$

where $\Delta H_{A_mO_n}$ and $\Delta H_{A_mO_n}$ are the heats of formation of the $A_mO_n$ and $B_mO_n$ oxides, respectively, $\Delta H_A$ and $\Delta H_B$ the heats of sublimation of the metals A and B, respectively, and $D_{(O_2)}$ is the oxygen dissociation energy, shows that the average metal-oxygen bond energy decreases in the order $La_{1-x}Ca_xCoO_3$, $La_{1-x}Sr_xCoO_3$, $La_{1-x}Ba_xCoO_3$. Thus, the $\alpha$-oxygen desorption temperature is dependent on the average metal-oxygen bond strength at the perovskite surface. $\beta$-oxygen desorption is due to removal of oxygen from normal lattice sites accompanied by reduction of the formal B site oxidation cation by one. More recent work has shown that partial substitution of the B-site cation in $La_{0.6}Sr_{0.04}Co_{0.8}M_{0.2}O_3$ with Cr, Mn, Fe, Ni, Ni and Cu affects both the onset temperature for and the amount of $\alpha$-oxygen evolved. The amount of $\alpha$-oxygen evolved decreased in the order Cu>Fe>Ni>Mn>Cr. (Y. Teraoka, T. Nobunaya, N. Yamazoe, Chem.Lett. 503 (1988).)

Good oxygen evolution catalyst sites can occur when using perovskites possessing the general composition $BaCo_{1-x}M_xO_3$, where M is Fe, Cu or Ag and x is a number from 0 to 1. For these compositions the vacancy concentration has been maximized by total replacement of the $Ln^{3+}$ cation by the alkaline earth cation $Ba^{2+}$. Previous work (M. Crespin and K. W. Hall, J.Cat. 69, 359 (1981)) suggests that water decomposition at perovskite surfaces proceeds via reaction with oxygen vacancies. Additionally, selection of Ba over Sr or Ca leads to lower average metal-oxygen bond strengths and B site doping with Fe, Cu or Ag has been previously shown to enhance oxygen desorption.

As a consequence, perovskite electrocatalysts of formula $BaCo_{1-x}M_xO_3$, where M is Fe, Cu or Ag ($0.05 \leq x \leq 0.2$) are of significant interest for catalytic reactors of this invention. The predominance of Co in the B lattice site is compatible with both the oxygen dissociative adsorption and oxygen evolution step. Introduction of Fe, Cu and Ag into this lattice site will contribute to low overpotentials associated with the oxygen evolution reaction.

Metal oxide supported Ni can be employed on a membrane of this invention as a catalyst for $CO_2/CH_4$ oxidative reforming to synthesis gas. The Ni:support ratio in these catalysts can vary from about 5:100 (5%) to about 100% Ni. Preferred Ni:support ratios are from about 1:10 (10% Ni) to 4:10 (40% Ni). Supports employed included inert supports (such as $\gamma$-$Al_2O_3$) and ionic and electronic conductors. Supports having Cr and Mn ions are expected to promote $CO_2$ absorption facilitating the reforming reaction. A preferred catalyst is Ni supported LSM. In addition, supports based on substitution of Cr and Mn into the metal oxide structure $La_{0.4}Sr_{1.6}GaFeO_{5.2}$ are useful as catalyst supports in this system.

Reduction catalysts for synthesis gas production include mixed conductor materials (e.g., lanthanum strontium cobaltate) and supported platinum group metal, e.g. Ni, Pd, Pt, Rh, Ru, Ir, and Os, catalysts. The metal:support ratio in these catalysts can vary from about 5:100 (5 wt %) to about 100 wt %. Preferred catalysts have from about 5 wt % to about 40 wt % metal on the support. Supports employed included inert supports (such as $\gamma$-$Al_2O_3$) and ionic- and electronic-conductors, such as LSC (lanthanum strontium cobaltate). Preferred reduction catalysts for synthesis gas production include LSC or Pt-supported on LSC.

Catalysts for hydrocarbon coupling include, but are not limited to, perovskite electrocatalysts. These catalysts generally have a transition metal on the B site of the $ABO_3$ perovskite structures. The A site is occupied by two different f/1-block elements or IA elements. Examples are $Sm_{0.5}Ce_{0.5}CuO_3$, $Tb_{0.8}Sm_{0.2}CuO_3$, $Gd_{0.9}Tb_{0.1}CuO_3$, $Gd_{0.9}Na_{0.1}MnO_3$, and $Tb_{0.8}Yb_{0.2}NiO_3$ (Kuchynka, D. J. et al. (1991) J. Electrochem. Soc. 138:1284).

Any of the above catalysts can be employed with membranes of this invention.

Membranes useful in the CMRs of this invention can be dense, gas-impermeable sintered materials in any desired shape, including membrane disks, flat plates, open tubes, closed-one-end tubes, etc., which can be adapted to form a gas-tight seal between the two reactor zones or chambers of CMRs. Membranes can be composed of the single phase ceramic material described herein, mixed phase ceramics as described herein, or can be composed of porous substrate with a gas impermeable thin film of the single phase or mixed phase ceramic material described herein.

Membranes can be formed by isostatic pressing of mixed metal oxide materials of this invention into dense substantially gas-impermeably membranes. Alternatively, substantially gas-impermeable membranes can be formed by forming dense thin films of ionically and electronically conducting mixed metal oxide on porous substrate materials. Again these two component membranes (porous substrate and dense thin film ) can have any desired shape including disks, tubes or closed-one-ended tubes. Porous substrates (which allow passage of gas through the substrate) can include various metal oxide materials including metal-oxide stabilized zirconia, titania, alumina, magnesia, or silica, mixed metal oxide materials exhibiting ion and/or electronic conduction or metal alloys, particularly those that minimally react with oxygen. The substrate material should be inert to oxygen or facilitate the desired transport of oxygen. More preferred substrates are those that have a thermal expansion coefficient (over the operational temperatures of the reactor) that is matched to that of the mixed metal oxide ion/electron conducting material.

Thin films (about 1–300 $\mu$m thick) of the mixed metal oxides of this invention are formed on the porous substrate by a variety of techniques, including tape casting, dip coating or spin coating. A presently preferred two component membrane is prepared by forming dense thin films of the mixed metal oxides of this invention on a porous substrate formed from the same mixed metal oxide material.

More specifically gas-impermeable membranes of this invention comprising an ionic- and electronic-conducting material can be prepared by admixing precursors of the metals Sr, Ca, Ln and M, where Ln and M are as defined above, in relative molar amounts according to the stoichiometry of the mixed metal oxide:

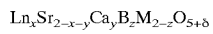

$$Ln_xSr_{2-x-y}Ca_yB_zM_{2-z}O_{5+\delta}$$

where Ln is an fblock lanthanide metal or yttrium or mixtures thereof; B is Ga, Al or In or mixtures thereof; M is a d block transition metal or mixtures thereof; $0.01 \leq x \leq 1.0$; $0.01 \leq y \leq 0.7$; $0.01 \leq z \leq 1.0$ and $\delta$ varies to maintain charge neutrality.

The precursors are optionally combined in an appropriate organic liquid, e.g., an alcohol, such as propanol or isopropanol, to facilitate mixing. The mixed precursors are milling to obtain a homogeneous powder and calcined at temperatures ranging from about 1100–1450° C. until the reaction is complete. The powder is preferably calcined twice with an intermediate step of grinding and sieving the calcined material. The reaction is complete when no change in the X-ray diffraction pattern of the calcined material is observed.

Metal precursor materials include metal oxides, metal carbonates, metal acetates, metal halides and/or metal nitrates of the metals of the formula above (Ln, Sr, Ca and M).

To form dense membranes, calcined powder is isostatically pressed to form a desired membrane shape (e.g., disk, closed-one-end tube, etc.). The powder is optionally mixed with an appropriate binder, such as polyvinylbutyral binder, prior to pressing. The pressed shaped membrane is then sintered in air at temperatures ranging from about 1150–1450° C. to form a dense membrane which is gas-impermeable.

Alternatively, the calcined powders can be used as discussed above to form dense thin films on a porous substrate.

Preferred gas-impermeable membranes of this invention are those that having an expansion coefficient less than about $15 \times 10^{-6}/°C$. and those that exhibit a total syngas production rate of at least about 5 ml/min·cm$^2$. More preferred preferred gas-impermeable membranes of this invention are those having total syngas production rates of at least about 10 ml/min·cm$^2$.

The ceramic materials may be prepared as single-phase or may contain small amounts of second phases, such as $SrAl_2O_4$-type compounds, to give a mixed-phase material. The presence of second phases are not detrimental to the properties of the mixed conducting materials, and may even enhance the mechanical properties of the materials. Second phases present in amounts equal to or less than about 20% by weight may act as sintering aids and/or provide mechanical strength to ceramic parts. Preferably, ceramic materials of this invention contain less than about 10% by weight or less than about 5% by weight of second phases.

In operation, the ceramic membranes are subjected to several stresses. Reactor design can minimize these stresses but cannot totally eliminate the problem. In the use of tubular ceramic membranes, for example, which are supported on alumina tubes, gas tight seals must be formed which accommodate the thermal expansion mismatch of the dissimilar reactor components. Chemical expansion also creates stresses which must be minimized. Again, using tubular ceramic membranes as an example, gas flows for the conversion of methane to synthesis gas are designed to flow air through the inner length of the tube, with methane flowing over the outside surface of the tube. Reversing the gas flows can cause the membrane tubes to burst. This effect is related to the chemical expansion of the materials under oxidizing and reducing atmospheres. The materials of this invention possess low expansion coefficients to help alleviate this problem.

Another stress membranes are subjected to during operation is stress due to chemical expansion. Ceramic metal oxides heated in air are generally chemically reduced. The loss of oxygen from the lattice causes an expansion in the unit cell. The loss of oxygen, and hence the chemical expansion, is modified by heating under either more oxidizing or reducing gases. When opposite sides of a membrane are heated under different atmospheres (different gases which may be at different pressures), a gradient of oxygen occupancy can exist through the membrane thickness. Hence, the stresses due to chemical expansion vary through the thickness of the membrane. Again, the materials of this invention reduce the effect of chemical expansion.

EXAMPLES

Example 1

General Preparation of Membranes from Single-Phase and Mixed-Phase Mixed Metal Oxides Starting materials for preparation of single- and mixed-metal oxides are obtained from commercial sources and typically are employed without further purification. For specific examples below, $La_2O_3$, $SrCO_3$, and $Al_2O_3$ are obtained from Alfa/Aesar at purities indicated below. $Fe_2O_3$ and $CaCO_3$ were obtained from Aldrich. A Loss on Ignition test (LOI) is performed on the above reagents to determine the amount of volatile compounds, (i.e., water, or $CO_2$) which are absorbed on the powders. For the $SrCO_3$ used LOIs range from about 0.5% to about 2.0% by weight. $La_2O_3$ is found to have LOIs ranging from about 0.9 to about 9.8% by weight. The other materials are found to have negligible LOIs. The LOI of a material received from a given supplier will generally vary with batch or lot and must be redetermined when a new batch or lot is employed. The LOI of material received in an individual shipment typically remained constant throughout the shelf life (several months) of that container in the laboratory. Exposure of starting materials to humid conditions may affect LOI.

The mixed metal oxide ceramic materials of this invention are, in general, prepared from powders using standard solid state synthesis techniques. All compounds are prepared from mixtures of the appropriate metal oxide(s) and metal carbonate(s) in amounts as indicated below. Powders are placed in a small polyethylene container with an equal amount, by volume, of isopropyl alcohol. Several cylindrical yttria-stabilized zirconia (YSZ) grinding media are also added to the container. The resulting slurry was mixed thoroughly on a ball mill for several hours. The alcohol is then allowed to evaporate yielding a homogeneous mixture of the starting materials. This homogeneous mixture is calcined to obtain the desired predominant MIEC phase. Powders are placed in alumina crucibles and fired at temperatures of 1100° C. to 1450° C. for 12 h in atmosphere. Upon cooling, the powders are sieved to 45 mesh size. Calcining is repeated if necessary (typically twice) until a consistent X-ray diffraction pattern indicates that reaction has gone to completion. XRD is performed using a Philips PW1830 X-ray generator with model 1050 goniometer for powder samples with a PW3710 control unit.

Before pressing and sintering, the particle size of the powders is reduced by attrition. A Union Process Model 01 attritor with a YSZ tank and YSZ agitator arms is used for this process. In a typical attrition, about 1.5 lbs of 5 mm, spherical YSZ grinding media are placed in the tank. Isopropyl alcohol (about 120 mL) is then added to the tank followed by about 100 g of the powder sieved to −45 mesh. The powder's particle size is reduced by attrition for 4 h, after which the alcohol is allowed to evaporate. XRD on the powder indicates that the attrition procedure does not cause decomposition. No decomposition is observed for any materials. The XRD patterns show considerable peak broadening, indicative of small particles. The particle size at this stage is believed to be submicron to several micron (e.g., 0.7–2 micron).

Membrane materials can be shaped into disks, plates, tubes, closed-one-end tubes or other useful shapes by isostatic pressing using appropriately shaped molds. For example, a commercial isostatic press (Fluition CP2-10-60) can be employed to form closed-one-end tube membranes. This press is capable of operation to 54,000 psi to form tubes of ~4 cm outer diameter and 10 cm in length. Powder is prepared and reduced in particle size as discussed above. A PVB (polyvinyl butyral) binder is added to the powder. A rubber mold is fabricated in the desired outer shape of the tube. A small amount of powder sufficient to form the top end of the closed-one-end tube is introduced into the mold. A mandrel having the shape of the inner surface of the tube is then inserted into the mold. A plug funnel is inserted into the top of the mold to allow powder to be added evenly around the mandrel. In particular, the funnel employed is designed so that it fits over the end of the mandrel and centers the mandrel in the mold. Powder is then poured into the mold via the funnel with vibration to ensure even packing. The mold is inserted into the press. Pressure of 15,000 psi to about 30,000 psi is applied to the mold for about 2 min. After pressurization, the mold is removed and the green tube is removed from the mold. Very high green densities up to 80%, as measured by the Archimedes method, can be obtained.

Green closed-one-end tubes are sintered by placing the tubes horizontally in a crucible with zirconia powder or setter of similar composition as the membrane. XRD of the tube surface after sintering indicated that no reaction had occurred between the setter and the tube. Straight closed-end tubes of sintered density typically between about 90% to 95% can be prepared using this method. Tubes with wall thicknesses ranging from about 0.5 mm to about 1.5 mm can be made by this method.

Membrane disks were formed by mixing the powder with a binder, e.g. a standard ceramic binder, such as Ceracer C640 (Shamrock), which is a polyethylene wax, with a mortar and pestle until a homogeneous mixture was obtained. Another suitable ceramic binder is methylcellulose. The binder/powder mixture (about 1 g,) was placed in a 12.5 mm diameter die. The mixture was then pressed into disks at 15,000 psi for several minutes. These "green" disks were then placed into an $Al_2O_3$ crucible for sintering. Disks were packed with powder of the same material to ensure that the disks did not react with the crucible or sinter together. Disks were sintered in the crucible in atmosphere for 4 h at the appropriate sintering temperature for a given material from about 1300° C. to about 1450° C. to obtain sintered disks preferably of $\geq 90\%$ theoretical density. Sintering temperature for a given material was determined empirically as is known in the art. Typical ramp rates during sintering were 3° C./min for both heating and cooling cycles.

Example 2

Preparation of $La_{0.3}Sr_{1.7}Al_{0.6}Fe_{1.4}O_{5+\delta}$

Ceramic material of composition $La_{0.3}Sr_{1.7}Al_{0.6}Fe_{1.4}O_{5+x}$ was prepared by mixing the following:

21.48 g of $La_2O_3$ (99.9% purity by weight on a rare earth metals basis)

58.39 g of $SrCO_3$ (99.9% purity by weight, with <1% Ba)

29.47 g of $Fe_2O_3$ (99+purity by weight)

8.07 g α-$Al_2O_3$ (99.99% purity by weight on a metals basis)

in isopropanol, followed by ball milling for 18–24 hours, after which the milled powder was dried and calcined in an alumina crucible (in air) for 6–12 hours at 1175–1350° C. The resulting powder was subjected to grinding and sieving before calcining a second time at 1175–1350° C. for 6–12 hours to complete reaction. The amounts combined were not adjusted for LOI. There is about a 2% combined deficiency of Sr and La in the mixture. It is expected that small amount, perhaps trace amounts, of second phases are present in the product.

To prepare dense one-closed-end tube membranes, the resulting powders were mixed with polyvinylbutyral binder, 2 to 3 wt %, but not more than 5 wt %, before pressing and sintering in air at 1150–1450° C. for 4–12 hours into dense close-one-end tubes. X-ray diffraction of sintered membrane material show what appears to be single-phase material.

Example 3

Preparation of $La_{0.3}Sr_{1.4}Ca_{0.3}Al_{0.6}Fe_{1.4}O_{5+\delta}$

Ceramic material of composition $La_{0.3}Sr_{1.4}Ca_{0.3}Al_{0.6}Fe_{1.4}O_{5+\delta}$ was prepared by the same procedure as above, using a starting mixture of:

13.84 g of $La_2O_3$ (99.9% purity by weight on a rare earth metals basis)
58.53 g of $SrCO_3$ (99.9% purity by weight, with <1% Ba)
8.50 g of $CaCO_3$ (99+% purity by weight)
31.66 g of $Fe_2O_3$ (99+purity by weight)
8.66 g $\alpha$-$Al_2O_3$ (99.99% purity by weight on a metals basis).

The amounts combined were not adjusted for LOI. There is about a 2% combined deficiency of Sr and La in the mixture. It is expected that small amount, perhaps trace amounts, of second phases are present in the product. Closed-one-end tube membranes were prepared as described above. FIG. 1 is an XRD pattern of this material after sintering. Very small peaks at about 30 and 35 indicate the presence of a small amount of a second phase which is believed to be $SrAlO_4$.

Example 4

Preparation of $La_{0.3}Sr_{1.2}Ca_{0.5}Al_{0.6}Fe_{1.4}O_{5+\delta}$

Ceramic material of composition $La_{0.3}Sr_{1.2}Ca_{0.5}Al_{0.6}Fe_{1.4}O_{5+\delta}$ was prepared by the same procedure as above, using a starting mixture of:

14.22 g of $La_2O_3$ (99.9% purity by weight on a rare earth metals basis)
51.56 g of $SrCO_3$ (99.9% purity by weight, with <1% Ba)
14.56 g of $CaCO_3$ (99+% purity by weight)
32.53 g of $Fe_2O_3$ (99+purity by weight)
8.90 g $\alpha$-$Al_2O_3$ (99.99% purity by weight on a metals basis).

The amounts combined were not adjusted for LOI. There is about a 2% combined deficiency of Sr and La in the mixture. It is expected that small amount, perhaps trace amounts, of second phases are present in the product. Closed-one-end tube membranes were prepared as described above.

Example 5

Preparation of $La_{0.3}Sr_{1.4}Ca_{0.3}Al_{0.8}Fe_{1.2}O_{5+\delta}$

Ceramic material of composition $La_{0.3}Sr_{1.2}Ca_{0.5}Al_{0.6}Fe_{1.4}O_{5+\delta}$ was prepared by the same procedure as above, using a starting mixture of:

14.07 g of $La_2O_3$ (99.9% purity by weight on a rare earth metals basis)
59.50 g of $SrCO_3$ (99.9% purity by weight, with <1% Ba)
8.64 g of $CaCO_3$ (99 +% purity by weight)
27.58 g of $Fe_2O_3$ (99+purity by weight)
11.74 g $\alpha$-$Al_2O_3$ (99.99% purity by weight on a metals basis).

The amounts combined were not adjusted for LOI. There is about a 2% combined deficiency of Sr and La in the mixture. It is expected that small amount, perhaps trace amounts, of second phases are present in the product. Closed-one-end tube membranes were prepared as described above.

Example 6

Preparation of $La_{0.6}Sr_{1.1}Ca_{0.3}Al_{1.0}Fe_{1.0}O_{5+\delta}$

Ceramic material of composition $La_{0.6}Sr_{1.1}Ca_{0.3}Al_{1.0}Fe_{1.0}O_{5+\delta}$ was prepared by the same procedure as above, using a starting mixture of:

27.20 g of $La_2O_3$ (99.9% purity by weight on a rare earth metals basis)
45.19 g of $SrCO_3$ (99.9% purity by weight, with <1% Ba)
8.36 g of $CaCO_3$ (99+% purity by weight)
22.21 g of $Fe_2O_3$ (99+purity by weight)
14.19 g $\alpha$-$Al_2O_3$ (99.99% purity by weight on a metals basis).

The amounts combined were not adjusted for LOI. There is about a 2% combined deficiency of Sr and La in the mixture. It is expected that small amount, perhaps trace amounts, of second phases are present in the product. Closed-one-end tube membranes were prepared as described above.

Example 7

The following materials were prepared using the procedures described in the preceding examples by combining starting materials as listed:

$La_{0.3}Sr_{1.7}Ga_{0.6}Fe_{1.4}O_{5+\delta}$
12.46 g of $La_2O_3$ (99.9% purity by weight on a rare earth metals basis)
63.30 g of $SrCO_3$ (99% purity weight, with <1% Ba)
28.44 g of $Fe_2O_3$ (99+purity by weight)
14.31 g $Ga_2O_3$ (99.99% purity by weight on a metals basis)

$La_{0.3}Sr_{1.7}Al_{0.8}Fe_{1.2}O_{5+\delta}$
13.51 g of $La_2O_3$ (99.9% purity by weight on a rare earth metals basis)
69.40 g of $SrCO_3$ (99% purity weight, with <1% Ba)
26.50 g of $Fe_2O_3$ (99+purity by weight)
11.28 g $Al_2O_3$ (99.99% purity by weight on a metals basis)

$La_{0.6}Sr_{1.4}Al_{1.0}Fe_{1.0}O_{5+\delta}$
26.16 g of $La_2O_3$ (99.9% purity by weight on a rare earth metals basis)
55.32 g of $SrCO_3$ (99% purity weight, with <1% Ba)
21.37 g of $Fe_2O_3$ (99+purity by weight)
13.64 g $Al_2O_3$ (99.99% purity by weight on a metals basis)

The amounts combined were not adjusted for LOI. There is about a 2% combined deficiency of Sr and La in the mixture. It is expected that small amount, perhaps trace amounts, of second phases are present in the product. In each case, closed-one-end tube membranes were prepared as described above.

Example 8

Syngas Production

Each of the above listed materials was tested for performance in catalytic membrane reactors. The reactors were fabricated using closed-one-end tubes of the chosen membrane material with a wall thickness of between 0.8 and 1.0 mm. A catalyst coating of 20 wt % Ni on LSM (lanthanum strontium manganate) was applied on the membrane partial oxidation surface, and LSC (lanthanum strontium cobaltate) was applied as the oxygen reduction catalyst coating. A packed bed was formed around the outside of the membrane, where the packing consisted of Ni(5 wt %) on $Al_2O_3$ granules. This type of packed-bed reactor is described in PCT/98/23051. Experiments were performed by placing the catalyst coated membrane into the catalytic membrane reactor and heating to temperatures up to 900° C. Air flow is through the inner surface of the tubular membrane, and a helium/methane mix flow is over the outer surface. The amount of methane in the mix is adjusted to give excess methane in the product stream. Results are listed in Table 1.

Reactors have been run for several hundred hours without drop in production rates, and without decomposition of the ceramic membrane. The product gas maintains a high $H_2$:CO ratio (under reactor conditions, theoretical ratio would be equal to 2). The CO selectivity and the ratio between CO and other C containing products (mainly $CO_2$) is quite high.

and reactors other than those specifically exemplified herein can be employed or adapted without undue experimentation to the practice of this invention. All such variants in methods, materials, reagents, solvents, structures and reactors that are known in the art and that can be so adapted or employed are encompassed by this invention.

All references cited herein are incorporated in their entirety by reference herein to the extent not inconsistent herewith.

TABLE 1

Syngas Production Rates of Catalytic Membrane Reactors

| Membrane Composition | Time (hr) | PRODUCTION RATE (ml/min-cm$^2$) | | | $H_2$:CO | CO Selectivity % |
| --- | --- | --- | --- | --- | --- | --- |
| | | $H_2$ | CO | $CO_2$ | | |
| $Sr_{1.7}La_{0.3}Al_{0.6}Fe_{1.4}O_{5+\delta}$ | 3408 | 15.83 | 9.30 | 0.10 | 1.7 | 98.9 |
| $Sr_{1.7}La_{0.3}Al_{0.8}Fe_{1.2}O_{5+\delta}$ | 264 | 10.49 | 6.71 | 0.07 | 1.6 | 98.9 |
| $Sr_{1.4}La_{0.6}Al_{1.0}Fe_{1.4}O_{5+\delta}$ | 576 | 7(1) | 3.4(2) | 0.02(3) | 2.2(3) | 99(1) |
| $Sr_{1.4}Ca_{0.3}La_{0.3}Al_{0.6}Fe_{1.4}O_{5+\delta}$ | 312 | 13(3) | 7.1(5) | 0.02(1) | 1.8(2) | 99.7(1) |
| $Sr_{1.2}Ca_{0.5}La_{0.3}Al_{0.6}Fe_{1.4}O_{5+\delta}$ | 72 | 9(2) | 4.9(6) | 0.02(2) | 1.9(2) | 99.6(2) |
| $Sr_{1.4}Ca_{0.3}La_{0.3}Al_{0.8}Fe_{1.2}O_{5+\delta}$ | 144 | 6.7(4) | 3.7(1) | 0.03(2) | 1.8(1) | 99.3(4) |
| $Sr_{1.1}Ca_{0.3}La_{0.6}Al_{1.0}Fe_{1.0}O_{5+\delta}$ | 96 | 5.3(7) | 2.7(5) | 0.006(3) | 2.0(3) | 99.77(8) |

Example 9

Expansion Measurements

Figure 3:
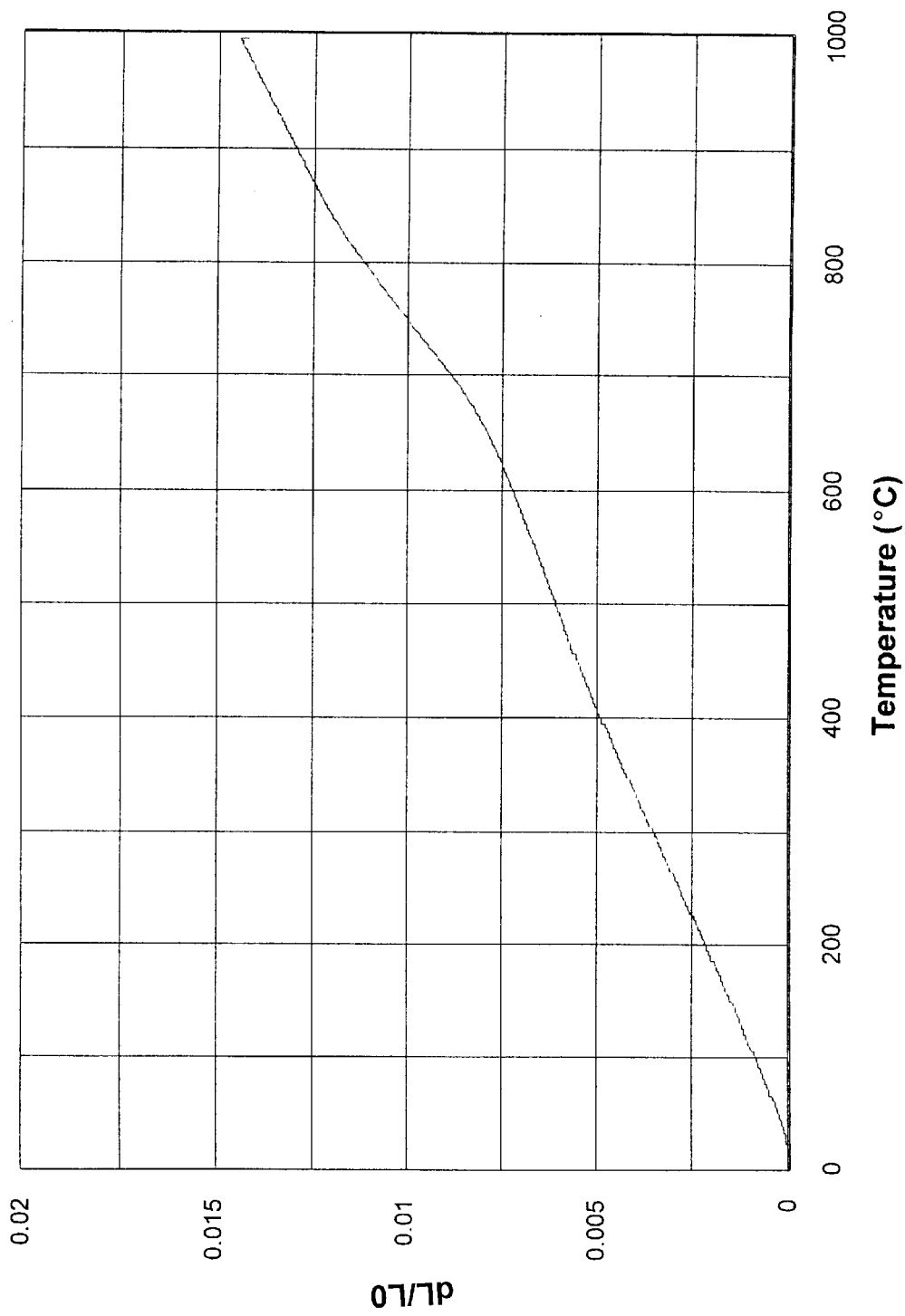
FIG. 3 is a graph of the expansion of $La_{0.3}Sr_{1.4}Ca_{0.3}Al_{0.6}Fe_{1.4}O_{5+\delta}$, as a function of temperature.

Measurements were made of the expansion characteristics of materials prepared. The measurements were performed on dilatometer equipped with a quartz pushrod in a vertical position. Displacement was measured with a Linear Voltage Displacement Transducer (Schaevitz GCA-121-050) gage head assembly placed over the rod and tube. See, for example, Kingery et al. (1976) *Introduction to Ceramics* (John Wiley & Sons, New York) Chapter 12). Samples were prepared from cutting parallel ends on a membrane tube, approximately 1" in length. Measurements were taken as the sample was heated in air at 1° C./min from room temperature up to 1000° C. No temperature holds for equilibration were performed. The values listed are for the total dimension change over the entire temperature range. An inflection point from between 400 and 700° C. is illustrated in FIG. 3. The inflection point is the point at which chemical expansion becomes noticeable. The values listed in Table 2 are for the total dimension change over the entire temperature range. The addition of calcium has the significant effect of decreasing the expansion by a substantial amount.

TABLE 2

Expansion Measurement of Selected Membrane Compositions

| Membrane Composition | Expansion Coefficient (10$^{-6}$/° C.) |
| --- | --- |
| $Sr_{1.7}La_{0.3}Ga_{0.6}Fe_{1.4}O_{5+\delta}$ | 20.4 |
| $Sr_{1.7}La_{0.3}Al_{0.6}Fe_{1.4}O_{5+\delta}$ | 19.8 |
| $Sr_{1.7}La_{0.3}Al_{0.8}Fe_{1.2}O_{5+\delta}$ | 18.5 |
| $Sr_{1.4}La_{0.6}Al_{1.0}Fe_{1.0}O_{5+\delta}$ | 17.6 |
| $Sr_{1.4}Ca_{0.3}La_{0.3}Al_{0.6}Fe_{1.4}O_{5+\delta}$ | 14.8 |
| $Sr_{1.2}Ca_{0.5}La_{0.3}Al_{0.6}Fe_{1.4}O_{5+\delta}$ | 14.5 |
| $Sr_{1.4}Ca_{0.3}La_{0.3}Al_{0.8}Fe_{1.2}O_{5+\delta}$ | 14.0 |

Those of ordinary skill in the art will appreciate that methods, materials, reagents, solvents, membrane structures

We claim:

1. A gas impermeable ceramic catalytic membrane comprising a mixed ionic and electronic conducting phase having the formula:

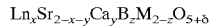

$$Ln_xSr_{2-x-y}Ca_yB_zM_{2-z}O_{5+\delta}$$

where Ln is an element selected from the fblock lanthanide elements and yttrium or mixtures thereof; B is an element selected from Al, Ga, In or mixtures thereof; M is a d-block transition element or mixtures thereof, $0.01 \leq x \leq 1.0$; $0.01 \leq y \leq 0.7$, $0.01 \leq z \leq 1.0$ and $\delta$ is a number that varies to maintain charge neutrality.

2. The ceramic membrane of claim 1 wherein in the mixed ionic and electronic conducting phase $0.30 \leq x \leq 0.60$, $0.05 \leq y \leq 0.3$ and $0.60 \leq z \leq 1.0$.

3. The ceramic membrane of claim 1 wherein B is Al in the mixed ionic and electronic phase.

4. The ceramic membrane of claim 1 wherein B is Ga in the mixed ionic and electronic phase.

5. The ceramic membrane of claim 1 wherein M is Fe in the mixed ionic and electronic phase.

6. The ceramic membrane of claim 1 wherein Ln is La in the mixed ionic and electronic phase.

7. The ceramic membrane of claim 1 wherein Ln is lanthanum, yttrium or a mixture thereof in the mixed ionic and electronic phase.

8. The ceramic membrane of claim 1 further comprising up to about 20% by weight of one or more second phases.

9. The ceramic membrane of claim 8 wherein the second phases are selected from $(Sr,La)_2(Al,Fe)O_4$ or $Sr(Fe,Al)_2O_4$.

10. A ceramic membrane reactor having a gas-impermeable ceramic membrane of claim 1.

11. A ceramic membrane reactor for the production of synthesis gas having the gas-impermeable membrane of claim 1.

12. A gas-impermeable ceramic membrane of claim 1 consisting essentially of about 80% or more by weight of a mixed ionic and electronic conducting phase and optionally from about 0.1 to about 20% by weight of one or more structurally distinct second phases which impart mechanical strength to the membrane.

13. A gas impermeable ceramic catalytic membrane of claim 1 wherein the mixed ionic and electronic conducting phase is a gas-impermeable thin film supported on a porous substrate.

14. The ceramic membrane of claim 13 wherein Ln is La, Y or a mixture thereof, B is Al, and M is Fe in the mixed ionic and electronic phase.

15. A method for oxidizing a reactant gas capable of reacting with oxygen which comprises the steps of:
(a) providing a catalytic membrane reactor cell comprising an oxidation zone and a reduction zone separated by a gas-impermeable ceramic membrane of claim 1 having a reduction surface and an oxidation surface;
(b) heating said reactor cell to a temperature of from about 300° C. to about 1200° C.;
(c) passing an oxygen-containing gas in contact with the reduction surface of said membrane of said heated reactor in said reduction zone; and
(d) passing said reactant gas in contact with the oxidation surface of said membrane of said heated reactor in said oxidation zone to effect oxidation of said reactant gas.

16. A method for production of synthesis gas by reaction of an oxygen-containing gas with a hydrocarbon which comprises the steps of:
(a) providing a catalytic membrane reactor cell comprising an oxidation zone and a reduction zone separated by a gas-impermeable ceramic membrane of claim 1 having a reduction surface and an oxidation surface;
(b) heating said reactor cell to a temperature of from about 300° C. to about 1200° C.;
(c) passing an oxygen-containing gas in contact with the reduction surface of said membrane of said heated reactor in said reduction zone; and
(d) passing a hydrocarbon gas in contact with the reduction surface of said membrane to effect the production of synthesis gas.

17. A method for preparing a gas-impermeable membrane having an expansion coefficient less than $15 \times 10^{-6}/°C$. and which exhibits a total syngas production rate of at least about 10 ml/min·cm$^2$ and which comprises an ionic- and electronic-conducting material which method comprises the steps of:
a. admixing precursors of the metals Sr, Ca, Ln and M where Ln is selected from the f block lanthanides and yttrium or mixtures thereof, B is Ga, Al or In or mixtures thereof; and M is selected from the d block transition metals or mixtures thereof in relative molar amounts according to the mixed metal oxide formula:

$$Ln_xSr_{2-x-y}Ca_yB_zM_{2-z}O_{5+\delta}$$

where $0.01 \leq x \leq 1.0$; $0.01 \leq y \leq 0.7$; and $0.01 \leq z \leq 1.0$;
b. milling the mixture to obtain a homogeneous powder;
c. calcining the milled powder at temperatures ranging from about 1175–1250° C. until the reaction is complete;
d. optionally mixing the calcined powder with a binder and pressing the powders isostatically to form a desired membrane shape;
e. sintering the shaped membrane in air at temperatures ranging from about 1175–1350° C. to form a dense membrane which is gas-impermeable.

18. The method of claim 17 wherein Ln is La or a mixture of La and Y and M is Fe.

19. The method of claim 17 wherein B is Al.

20. The method of claim 17 wherein $0.30 \leq x \leq 0.60$, $0.05 \leq y \leq 0.3$ and $0.60 \leq z \leq 1.0$.

* * * * *

UNITED STATES PATENT AND TRADEMARK OFFICE
CERTIFICATE OF CORRECTION

PATENT NO. : 6,146,549
DATED : November 14, 2000
INVENTOR(S) : Mackay et al.

Page 1 of 1

It is certified that error appears in the above-identified patent and that said Letters Patent is hereby corrected as shown below:

Column 9,
Line 50, replace "a oxygen" with -- $\alpha$ oxygen --.

Column 11,
Line 6, replace "$Gd_{0.9}Tb_{0.1}CuO_3$" with -- $Gd_{0.9}Th_{0.1}CuO_3$ --.

Signed and Sealed this

Twenty-third Day of October, 2001

Attest:

NICHOLAS P. GODICI
Attesting Officer  Acting Director of the United States Patent and Trademark Office